Figure 1:
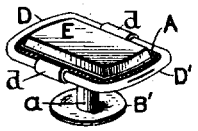

J. CALDWELL & H. B. WINSLOW,

Assignors to HORTON, ANGELL & Co.

Sleeve Button.

No. 9,449. Reissued Nov. 9, 1880.

WITNESSES.

Geo. W. Cady.

Wm. A. Cady

INVENTORS.

John Caldwell.

Henry B. Winslow.

by

Edson Salisbury Jones.

Attorney.

N. PETERS, PHOTO-LITHOGRAPHER, WASHINGTON, D. C.

UNITED STATES PATENT OFFICE.

JOHN CALDWELL AND HENRY B. WINSLOW, OF PROVIDENCE, RHODE ISLAND, ASSIGNORS TO HORTON, ANGELL & CO.

SLEEVE-BUTTON.

SPECIFICATION forming part of Reissued Letters Patent No. 9,449, dated November 9, 1880.

Original No. 130,015, dated July 30, 1872. Application for reissue filed December 29, 1879.

*To all whom it may concern:*

Be it known that we, JOHN CALDWELL and HENRY B. WINSLOW, both of the city and county of Providence and State of Rhode Island, have jointly invented certain new and useful Improvements in Buttons; and we do hereby declare that the following specification, taken in connection with the accompanying drawings, forming a part of the same, is a full, clear, and exact description thereof.

Our invention relates to that class of buttons which are made in two separable parts for convenience of application and removal, one of said parts being composed of a shoe and post and the other of a head provided with means for locking the parts of the button together.

Our invention consists, first, in a novel combination of locking devices with the head and post of a button, whereby the post is externally engaged at opposite points and the parts of the button are detachably combined; and, secondly, in a novel construction of the head of the button, which consists in providing said head with a detachable face member and means for securing it to the head in such a manner that the said face member may be removed and returned, or be replaced by others of the same or a different style, if desired.

Our improvements are applicable to sleeve-buttons, collar-buttons, studs, &c.; but for the purpose of illustrating our invention we have chosen a sleeve-button, which is represented in the drawings as follows.

Figure 2:
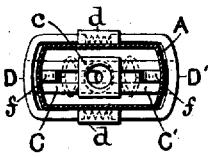
Figure 3:
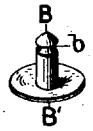
Figure 4:
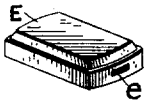
Figure 5:
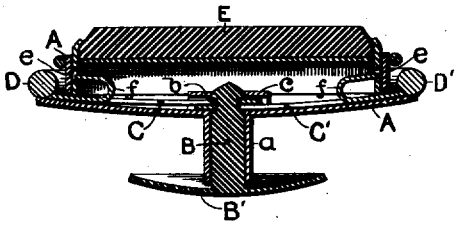

Figure 1 shows, in perspective, a sleeve-button embodying our improvements. Fig. 2 represents a top view of the same with the face member removed. Fig. 3 shows the combined post and shoe in perspective. Fig. 4 represents, in perspective, the face member detached; and Fig. 5 shows a vertical longitudinal section of the button on an enlarged scale.

A denotes the shell of the button-head, which is composed of a back member and a rim, and is provided with a tubular stem, *a*, secured to the head and projecting therefrom at a right angle. B denotes the post, which is secured to a shoe, B′. The free end of the post B is conical or rounded, that it may readily enter the stem *a*, and near said end it is encircled by a shouldered annular recess, *b*, with which the locking devices C C′ engage to retain the parts of the button in combination. Each of these locking devices is in the form of a yoke or a plate, from which a portion is removed to allow the end of the post to enter and occupy the button-head, and to adapt each plate to engage the post when the latter is in position. The inner ends of the locking devices C C′ are retained in position and guided by a cap-plate, *c*, which is perforated to receive the end of the post. The outer ends pass through openings in the rim of the button-head, and are attached to curved finger-pieces D D′, which are adapted to the configuration of the button-head, and whose ends enter tubular chambers *d* arranged at the sides of said head. Each of these chambers *d* contains an expansive spiral spring, which presses the finger-pieces D D′ outward, thereby causing the locking-plates to engage the post B externally on two sides when said post is in position and hold the two parts of the button in combination.

To combine the parts of the button it is only necessary to insert the post B into the stem *a* and press the parts together. The conical or rounded end of the post will move the locking devices inward toward each other until said devices and the recess *b* are in alignment, when the springs in the chambers *d d* will move the locking devices outward and cause them to engage the post. In separating the two parts of the button the finger-pieces D D′ are pressed toward each other sufficiently to cause the engaging portion of the locking devices to outlie the shoulder formed by the recess *b* on the post, when the post may be withdrawn or the head removed.

E denotes the detachable face member, which may have a glass front similar to a locket, or be made in any preferred style. It is provided with a rim adapted to fit the shell of the button-head, which rim is slotted at opposite points, *e*, to receive the locking-bolts *f* attached to the devices C C′. The face member E may be detached by pressing the finger-pieces D D′ sufficiently to withdraw the bolts *f* from the slots *e*, and may be combined with the button-head by a like pressure of the finger-pieces to allow the rim of said member to enter between the ends of the bolts *f* and rim of the button-head. When the finger-pieces are released the bolts *f* will pass into the slots *e* and the face member will be locked in position.

Instead of employing the curved finger-pieces D D′, tubular chambers *d*, and their inclosed springs, the springs may as well be placed inside the button-head and arranged to press the locking devices C C′ outward by, for instance, having the springs abut against the rear of the bolts *f* and the adjacent faces or edges of the cap-plate *c*. With such a construction the exterior ends of the locking devices C C′ might be ornamented and arranged for receiving pressure direct, in which case the said outer ends become the bars or pieces which are pressed by the fingers to unlock the two parts of the buttons.

The general form of the button can be readily varied to any desired extent to meet the usual requirements of the trade.

We are aware that it is not new to combine spring-catches with the head and the removable shank or post of a button; but we are not aware of the existence of any combination and arrangement of devices prior to our invention by means of which the shouldered post or shank at the annular recess has been externally engaged at opposite points by separate locking devices in connection with pushers, by means of which the said locking devices may be moved simultaneously in opposite directions to release their hold on the post. When embraced on one side only and released by pressure applied at a single point they are much more liable to loss by inadvertent detachment than when they require for displacement the moving of two releasing devices actuated by pressure in opposite directions. By having the embracing-yokes operated in different directions the extent of movement on each is about half that which would be required with a single catch, and therefore the necessary pressure-points for operating them are much less prominent, and hence less liable to be inadvertently operated than if the single yoke be employed.

Again, if the post should be embraced internally by separate devices, the post necessarily would be inconveniently thick and large, while the parts of the button would not be so securely locked together, and would be more liable to become accidentally detached than would be the case when the post is engaged externally.

Having described our invention, what we claim, and desire to secure by Letters Patent, is—

1. The combination, substantially as hereinbefore set forth, with the head and detachable shouldered post of a separable button, of the spring-controlled locking devices as arranged so that the distance between their locking or engaging faces, when in normal position, is less than the diameter of the post-head and push-bars or finger-pieces, which, when pressed inward, separate the locking devices, and thereby release the post.

2. In combination with the shell of a button-head, a detachable face member and movable bolts for locking said face member to the shell, substantially as set forth.

JOHN CALDWELL.
HENRY B. WINSLOW.

Witnesses:
EDSON SALISBURY JONES,
WILMARTH H. THURSTON.